United States Patent [19]
Martin et al.

[11] Patent Number: 5,983,119
[45] Date of Patent: Nov. 9, 1999

[54] WIRELESS COMMUNICATION DEVICE ANTENNA INPUT SYSTEM AND METHOD OF USE

[75] Inventors: Roger W. Martin, San Diego; Jason B. Kenagy, La Jolla, both of Calif.

[73] Assignee: Qualcomm Incorporated, San Diego, Calif.

[21] Appl. No.: 08/775,347

[22] Filed: Jan. 3, 1997

[51] Int. Cl.[6] .................................................. H04Q 7/32
[52] U.S. Cl. ......................... 455/575; 455/90; 379/428
[58] Field of Search ..................................... 455/575, 572, 455/90, 550, 129, 128, 351, 348, 349, 450; 379/433, 434, 428; 343/702, 882

[56] References Cited

U.S. PATENT DOCUMENTS

| | | | |
|---|---|---|---|
| 4,857,919 | 8/1989 | Braswell | 340/870 |
| 4,951,505 | 8/1990 | Seiler | 73/152 |
| 5,038,405 | 8/1991 | Karr | 455/497.1 |
| 5,079,558 | 1/1992 | Koike | 343/702 |
| 5,276,454 | 1/1994 | Gonzalez et al. | 343/702 |
| 5,321,738 | 6/1994 | Ha | 455/575 |
| 5,436,954 | 7/1995 | Nishiyama et al. | 379/428 |
| 5,448,240 | 9/1995 | Morito | 341/176 |
| 5,497,506 | 3/1996 | Takeyasu | 379/433 |
| 5,513,383 | 4/1996 | Tsao | 455/90 |
| 5,535,435 | 7/1996 | Balzano et al. | 455/90 |
| 5,535,439 | 7/1996 | Katz | 455/90 |
| 5,630,211 | 5/1997 | Nagai | 379/433 |
| 5,640,689 | 6/1997 | Rossi | 455/90 |
| 5,644,320 | 7/1997 | Rossi | 343/702 |
| 5,721,558 | 2/1998 | Holemans | 340/870 |
| 5,734,716 | 3/1998 | Kulberg | 379/433 |
| 5,771,466 | 5/1995 | Tsugane et al. | 343/882 |
| 5,828,965 | 10/1998 | Brown et al. | 455/550 |
| 5,831,579 | 4/1997 | Rudisill | 343/702 |
| 5,842,124 | 11/1998 | Kenagy et al. | 455/550 |

*Primary Examiner*—William G. Trost
*Assistant Examiner*—Jean A. Gelin
*Attorney, Agent, or Firm*—Russell B. Miller; Roger W. Martin; Charles D. Brown

[57] ABSTRACT

A combination antenna and input device for a wireless communications device is disclosed. The antenna is coupled by a link to a position sensor that senses user movement of the antenna. In one embodiment, the antenna is rotatably retained within a housing and may be manipulated by the user. The position sensor detects rotational movement of the antenna and thereby controls functionality of the wireless communications device. The antenna may also be displaced along a longitudinal axis to enable user-selected functions. The position sensor may be mechanical, optical, or other form of electrical rotational position sensor.

34 Claims, 7 Drawing Sheets

--PRIOR ART--

WIRELESS COMMUNICATION DEVICE ANTENNA INPUT SYSTEM AND METHOD OF USE

BACKGROUND OF THE INVENTION

I. Technical Field

The present invention is directed generally to a wireless communications input device, and, more particularly, to a system and method for controlling input with an antenna input device.

II. Background of the Invention

A wireless communication device, such as a cellular telephone, personal communication system (PCS) device, radio telephone, and the like, all have certain common elements that are generally required for normal operation. Each of these required elements are typically present in all wireless communications devices in one form or another. For example, every wireless communications device typically must have a transmitter and receiver, or transceiver, to permit communications with remote locations. In addition, a wireless communications device typically must have some sort of antenna to couple radio frequency (RF) signals to and from the transceiver. In addition, the conventional wireless communications device usually has a keyboard or other user input device to permit user control of the wireless communications device.

The current trend in wireless communications devices is to miniaturize the wireless communications device thus making it more easily transported by the user. Certain of these required circuit elements can also be miniaturized, such as through the use of integrated circuit design for the transceiver. However, it is still necessary to have a user input device to control the wireless communications system. Previous attempts to miniaturize this portion of the wireless communications device have been only of limited success. Therefore, it can be appreciated that there is a significant need for a wireless communications input control system and method of operation. The present invention provides this and other advantages as will be apparent from the following figures and accompanying detailed description.

SUMMARY OF THE INVENTION

The present invention is embodied in a system and method to provide an input device for a wireless communications device having a housing and transceiver. The input device comprises an antenna, movably coupled to the housing, and a position sensor to detect movement of the antenna. The position sensor provides movement data in response to user movement thereof. In this manner, the user can control input data to the wireless communications device.

In one embodiment, the antenna is rotatably retained within the housing and the position sensor senses user rotation of the antenna. The position sensor itself may comprise a mechanical switch, coupled to the antenna by a link, an optical rotation sensor, synchro-to-digital converter, or the like. The position sensor detects user manipulation of the antenna and generates signals to control the wireless communications device.

The system can operate with an antenna being extendible or nonextendible from the housing along a longitudinal axis of the antenna. In one embodiment, the antenna is rotated while in a retracted position to control some functions of the wireless communications device. The same antenna rotation while in an extended position can control the same functions or different functions of the wireless communications device.

The communications device itself may include a display having a plurality of user-selectable menu options, which are selected by user rotation of the antenna. The wireless communications device may also include a user-activated selection switch to activate the user-selected menu option by depressing the antenna in a direction along the longitudinal axis of the antenna.

The antenna input device can be used to control functions such as the selection of power ON and OFF, and the selection of an on-hook and off-hook mode. The antenna may have a mechanical biasing element, such as a spring, to urge the antenna to a predetermined position. The position sensor detects movement of the antenna from the predetermined position to control operation of the wireless communications device.

The antenna may also have multiple extendible positions to control various functions of the wireless communications device. For example, the antenna may be in a first position when the wireless communications device is in a power OFF mode. Extending the antenna to a first extended position may cause the power to be applied to the wireless communications device. Extending the antenna to a second extended position may activate the wireless communications device by placing it in an off-hook mode. The antenna device may be further rotated about its longitudinal axis to control the selection of different user options.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
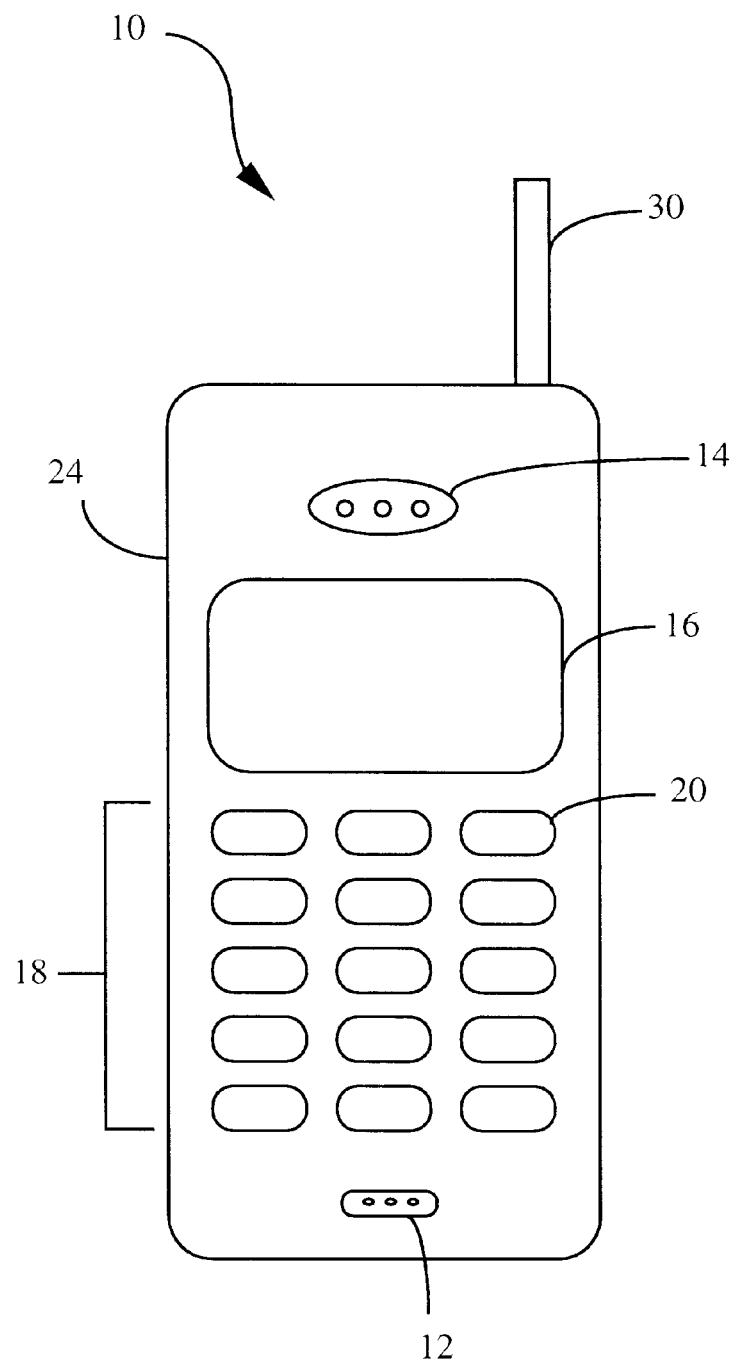
FIG. 1 is a front plan view of a conventional wireless communications device.

As discussed in the background of the present invention, a wireless communications device requires certain components for satisfactory operation. A conventional wireless communications device 10 is illustrated in FIG. 1. The wireless communications device 10 includes a microphone 12 and speaker 14 to permit audio communication between the user and a remote location, such as a cell site controller (not shown). The typical wireless communications device also includes a display 16 and a keypad 18. The display 16 may be used for providing the user with instructions, or the display of messages if the wireless communications device has text messaging capabilities, as is common in a personal communications system (PCS) wireless communications device. The keypad 18 contains a plurality of keys (not shown) such as alphanumeric digits, control keys, and the like. The keypad 18 is selectively activated by the user to control operation of the wireless communications device 10. In addition to the keypad 18, the wireless communications device 10 also includes one or more control buttons 20, such as the Power ON/OFF button, SEND button, END button, and the like.

The components described above are physically attached to a housing 24. The housing 24 also contains electrical circuitry (not shown) coupled to the components described above. For example, contained within the housing 24 are a battery, as well as a transmitter, and receiver. These components are well known and, for the sake of brevity, are not shown in FIG. 1 or discussed in greater detail. The transmitter and receiver are coupled to a radio frequency (RF) antenna 30. The antenna 30 of the conventional wireless communications device 10 is typically extendible by the user during operation of the wireless communications device 10. Alternatively, the antenna 30 may be fixed, or may be a combination of fixed (such as helical) and extendible (such as whip) antennas.

The antenna 30 of the conventional wireless communications device 10 serves only to couple RF energy to and from the transmitter and receiver (not shown) contained within the housing 24. In contrast, the present invention provides additional functionality for the antenna by using the antenna as a user input device to control operation of the wireless communications device. The present invention is illustrated in the functional block diagram of FIG. 2. A wireless communications device 100 of the present invention contains many conventional components, which will be described only briefly herein. The wireless communications device 100 includes a CPU 102, which may be a conventional microprocessor, embedded controller, custom integrated circuit, or the like. A memory 104, which may include both random access memory (RAM) and read-only memory (ROM), provides instructions that are executed by the CPU 102 and provides data storage locations used by the CPU. The wireless communications device 100 also includes a display 106 and an optional keypad 108.

A transmitter 110 and receiver 112 transmit and receive RF energy in a conventional manner. Circuitry within the transmitter 110 and receiver 112 may be combined to form a transceiver 114. For the sake of clarity, the present specification will refer to the transceiver 114, which encompasses both the transmitter 110 and receiver 112.

The transceiver 114 is electrically coupled to an antenna 120. The antenna 120 is designed to transmit and receive RF energy at one or more frequency bands. The operation of the antenna for RF purposes is well known in the art and need not be described in greater detail herein. The wireless communications device 100 includes a position sensor 122 which is coupled to the antenna 120 by a link 124. The position sensor 122 detects the physical position of the antenna 120 via the link 124. As will be described in greater detail below, the link 124 may be a mechanical, electrical, or optical link that couples the position sensor 122 to the antenna 120. The various portions of the wireless communications device 100 are coupled together by a bus system 126, which may comprise various distribution lines which carry power, control signals, and status signals in addition to data.

The wireless communications device 100 advantageously combines the functionality of antenna and input device. Because all wireless communications devices have an antenna for RF transmission and reception, the antenna 120 of the wireless communications device 100 provides data input via the antenna thus combining the functionality of RF antenna and user input device. The antenna 120 of the present invention may be used to input data to the wireless communication device 100, and to select various functional options or retrieve stored data. For example, data items such as user preferences, destination telephone numbers, data messages, and the like may be programmed into the memory 104 using the antenna 120 and position sensor 122 in combination with a user-driven menu presented on display 106, or they may be entered into the memory 104 from keypad 108 or an external device, such as a computer, using a conventional interface port (not shown), or a combination of these methods. The antenna 120 and position sensor 122 may subsequently be used to select the desired user preferences, destination telephone numbers or data messages from a list retrieved from memory 104 and shown on the display 106. In a simplified embodiment, the antenna 120 and position sensor 122 used in combination with a user-driven menu presented on display 106 may be used to replace the functionality of keypad 108.

Figure 2:
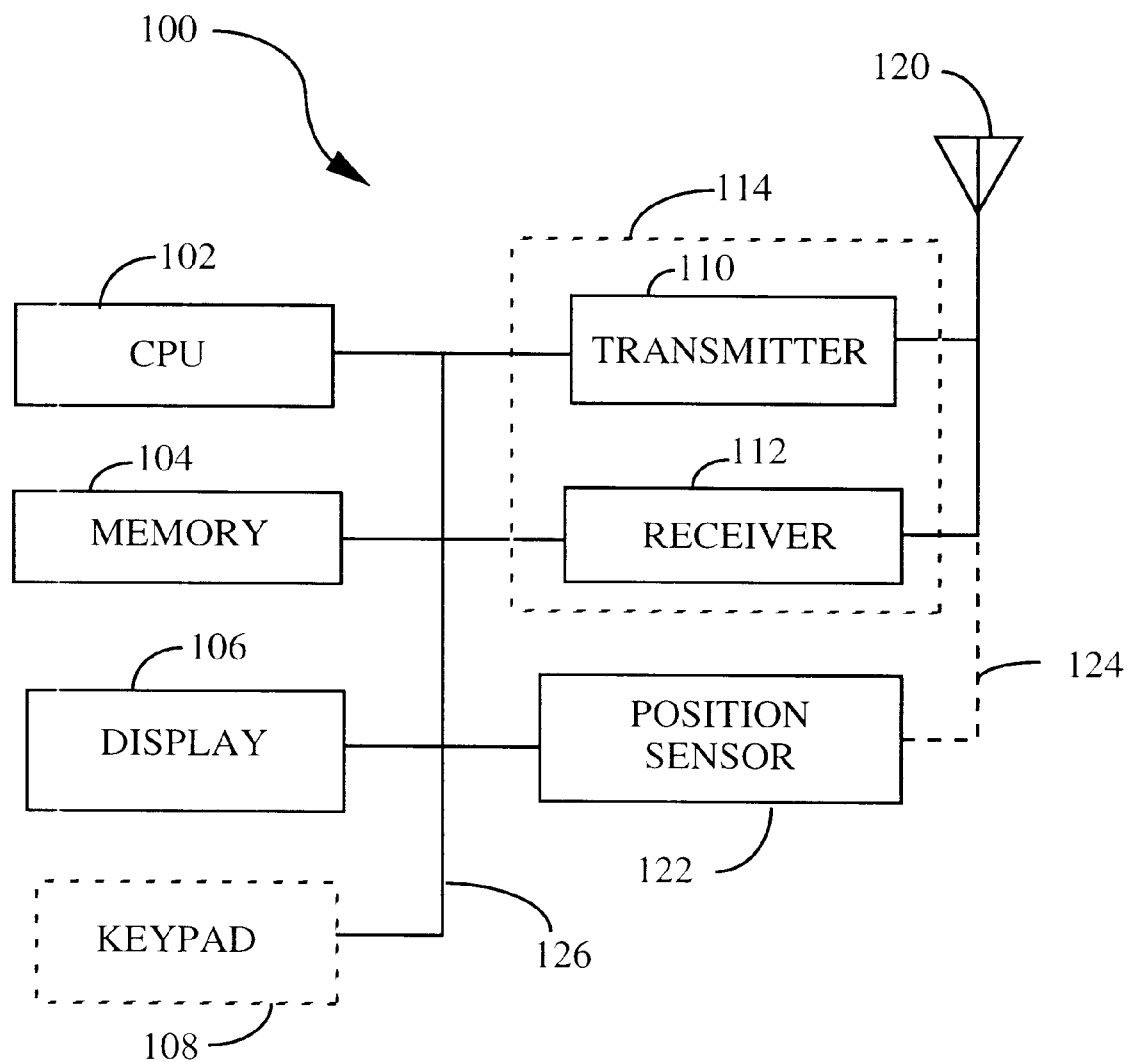
FIG. 2 is a functional block diagram of the wireless communications device of the present invention.
Figure 3A:
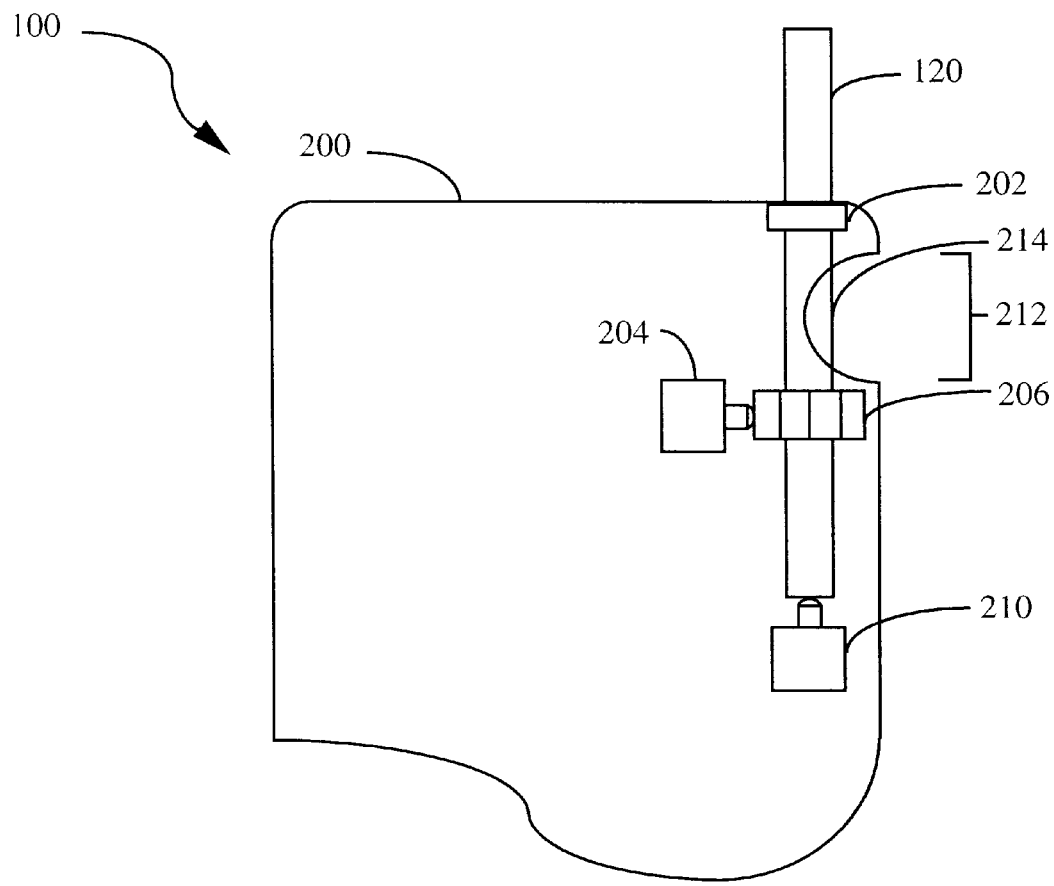
FIG. 3A is a partial broken view of the wireless communications device of FIG. 2 illustrating the operation of an antenna as an input device.

An exemplary embodiment of the antenna input device apparatus of wireless communications device 100 of the present invention is illustrated in FIG. 3A where the antenna 120 is secured within a housing 200 by retainer 202. The retainer 202 permits the antenna 120 to rotate circumferentially within the housing 200. In this embodiment, a mechanical switch 204 is linked to the antenna 120 by a cam 206. The mechanical switch 204 is preferably mounted on a printed circuit board (not shown) within the housing 200. The cam 206 is fixedly attached to the antenna 120 and rotates therewith. As the user rotates the antenna 120, the cam 206 activates the mechanical switch 204 thus sensing rotational movement of the antenna 120. Mechanical switch 204 may be a plunger-type switch or ratcheting-type switch as are known in the art. The antenna position sensor 122 (FIG. 2) senses the activation of mechanical switch 204 and generates an antenna position signal for use by CPU 102 as described herein.

As can be seen from FIG. 3A, the housing 200 may further include a cutout portion 212 which exposes a portion 214 of the antenna 120 for rotation by the user. This embodiment advantageously facilitates one-handed operation with the user cradling the housing 200 in one hand and rotating the exposed antenna portion 214 with a finger. The exposed antenna portion 214 may include knurls or other textured surface to assist the user in rotating the antenna 120. Alternatively, the exposed antenna portion may be covered with a material, such as rubber, to assist the user in rotating the antenna 120. Thus, the user of communication device 100 may access antenna 120 at any portion which is exposed externally to housing 200.

Figure 3B:
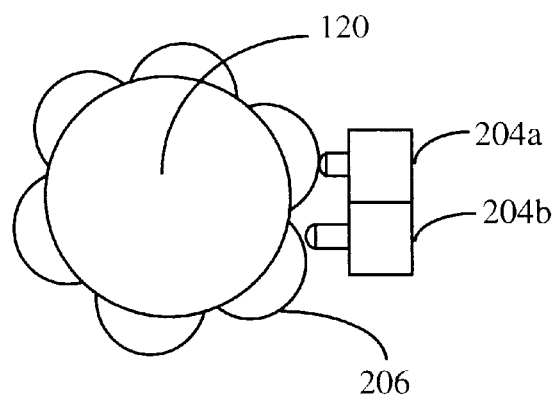
FIG. 3B is a partial broken away view of the wireless communication device of FIG. 2 illustrating an alternative technique for the operation of an antenna as an input device.

The rotational direction of the antenna 120 may be determined through the use of multiple mechanical switches. This is illustrated in FIG. 3B wherein mechanical switches 204*a* and 204*b*, illustrated as plunger-type switches, are sequentially activated by the cam 206. As viewed from above as shown in FIG. 3B, if the rotational direction of the antenna 120 is clockwise, switch 204*a* is activated first, followed by the activation of switch 204*b*. Such is the present state of the cam-switch arrangement as shown in FIG. 3B. If the rotational direction of the antenna 120 is counterclockwise, as viewed from above, the switches 204*a* and 204*b* are activated in the reverse order. In this manner, the wireless communications device 100 can utilize the antenna 120 as a user input device by rotating the antenna in either direction. Such an embodiment is particularly useful if the display 106 (see FIG. 2) is a menu-driven display with a plurality of user options shown on the display. The user may readily move up or down through a display list by rotating the antenna 120 in a clockwise or counterclockwise fashion, respectively.

Returning again to FIG. 3A, the antenna 120 may be displaced along a longitudinal axis in addition to rotational movement. The longitudinal displacement, such as depression of the antenna 120, activates a second mechanical switch 210. Mechanical switch 210 may also be a plunger-type switch or other switch as is known in the art. In an exemplary embodiment, the mechanical switch 210 is used to activate a user selection. For example, the user may rotate the antenna 120 to select an option on the display 106 (see FIG. 2). The display 106 may include, for example, a cursor, reverse video or other highlight to indicate the current selection. The current selection is altered as the user rotates the antenna 120. When the user has selected the desired option, the user may depress the antenna 120 in the longitudinal direction to activate switch 210 and thereby activate the selected menu item. It should be noted that the selection of user options described herein is not limited to "menu" type items, but may be selected from any list such as a menu, graphical user interface, icon or the like. Furthermore, the user selected option may be activated by extension rather than depression of the antenna 120 which activates the second mechanical switch 210. Other activation techniques, such as depression of a key on keypad 108, can also be used with the wireless communication device 100.

Figure 4:
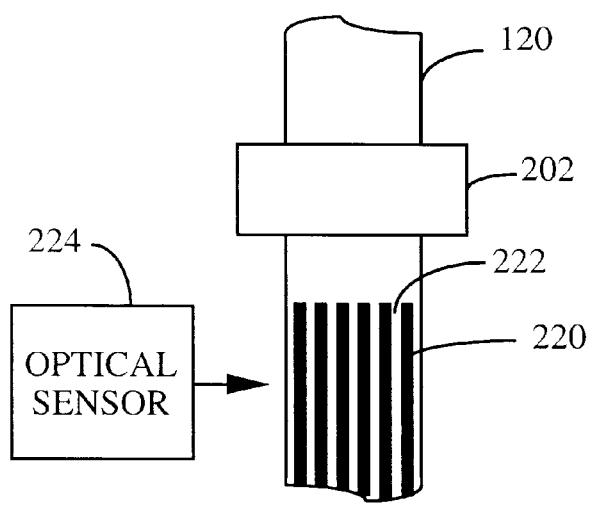
FIG. 4 illustrates the use of an optical position sensor if the wireless communications device of FIG. 2.

FIGS. 3A and 3B illustrate one embodiment of the position sensor 122 (see FIG. 2). However, the position sensor 122 and link 124 may be implemented by a variety of well-known techniques. For example, the position sensor may be an optical rotation sensor, rotational variable differential transformer (RVDT), or the like. The specific form of the link 124 depends on the type of position sensor 122. For example, if the position sensor 122 is an optical rotation sensor, the link 124 may be infrared light signals reflected off of the antenna 120. Alternatively, the link 124 may be a slotted wheel, such as commonly used in a mouse or other computer input device. An optical sensor embodiment of the position sensor 122 is illustrated in FIG. 4. A portion of the antenna 120 contains a series of dark lines 220 separated by reflective spaces 222. An optical sensor 224 detects variations in reflectance from the lines and reflective spaces as the antenna 120 is rotated. The optical sensor 224 includes an optical source, such as an infrared light emitting diode (not shown) and an optical detector, such as an infrared phototransistor (not shown). These components are well known in the art and typically incorporated into a single device manufactured by a number of different companies, such as Texas Instruments.

Figure 5:
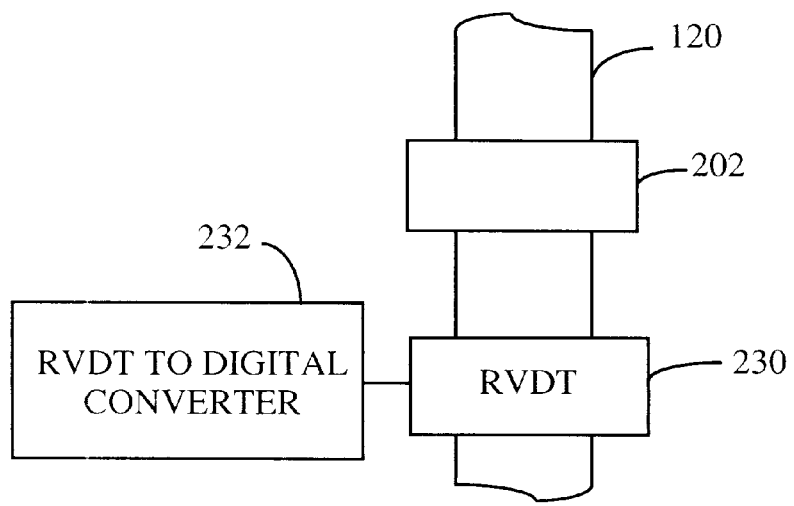
FIG. 5 illustrates the use of a rotary variable differential transformer to sense rotational movement of the antenna of the wireless communications device of FIG. 2.

As the antenna is rotated, the optical sensor 224 detects changes in reflectivity and generates signals indicative of the antenna rotation. In FIG. 5, a rotary variable differential transformer (RVDT) 230 is coupled to the antenna 120 to detect rotational movement thereof. Signals generated by the RVDT 230 are coupled to an RVDT-to-digital converter 232. The VDT-to-digital converter 232 generates signals indicative of the rotational movement of the antenna 120. Other well-known forms of rotational sensing may also be used in the wireless communications device 100. Therefore, the present invention is not limited by the specific form of the position sensor 122 (see FIG. 2).

Figure 6A:
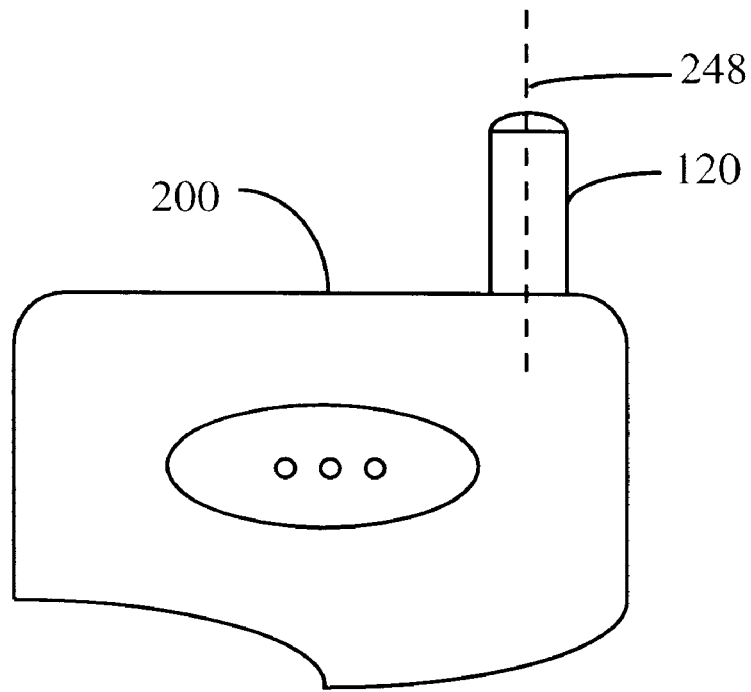
FIG. 6A is a partial front plan view illustrating the rotation of an antenna input device into one of a limited number of positions.
Figure 6B:
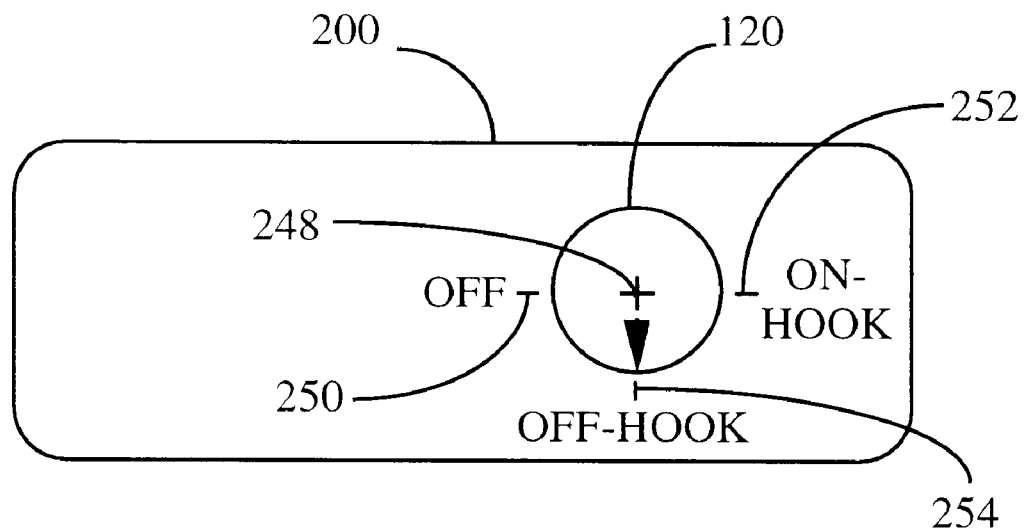
FIG. 6B is a top plan view of the embodiment of FIG. 6A, illustrating the rotation of the antenna to one of a limited number of positions.

In the embodiment discussed above with respect to FIGS. 3A and 3B, the antenna 120 is freely rotatable within the housing 200. The cam 206 provides tactile feedback to the user in addition to activating the mechanical switch 204. However, the wireless communications device 100 may include one or more mechanical stops (not shown) to limit rotational movement of the antenna 120. Such an embodiment is shown in FIGS. 6A and 6B where the antenna 120 rotates about an axis of rotation 248. The antenna 120 may be coupled via the cam 206 to the switch 204 such that only a limited number of positions are selectable by the user. This embodiment may be advantageously used to activate the wireless communications device 100. As shown in FIG. 6B, a first position 250 of the antenna 120 is detected by the position sensor 122 and corresponds to a "Power Off" condition in which the wireless communications device 100 is inoperable. A second position 252 of the antenna 120 is detected by the position sensor 122 and corresponds to an "on-hook" condition in which the wireless communications device 100 is activated, but is not currently engaged in an ongoing communication. The antenna 120 may be rotated by the user to a third position 254 indicative of an "off-hook" condition.

When the wireless communication device 100 is, for example, a portable radiotelephone, and is powered on with a call in progress, the radiotelephone is said to be in an "off-hook" hookswitch state. In the preferred embodiment, the transitioning of antenna 120 from the second position 252 to the third position 254 may be used to answer an incoming call, thereby going "off-hook" without the additional step of pressing a key of optional keypad 108 (FIG. 2). Conversely, when the wireless communication device 100 is powered on, and antenna 120 is in the second position 252, the wireless communication device 100 is in a state where it may still perform normal background functions such as registering with a base station, monitoring a paging channel, handing-off between two base stations, and the like, but may not originate or answer a call without rotating antenna 100 to the third position 254. This state is commonly referred to as being in an "on-hook" hookswitch state. If the wireless communication device 100 is powered off, it is in an hookswitch disabled state, and is neither on-hook nor off-hook.

Furthermore, the position of antenna 120 may be used to control the functionality of keypad 18, disabling the keypad when the antenna is in the first position 250 or second position 252, and enabling the keypad with the antenna is in the third position 254. This embodiment for the wireless communications device 100 prevents inadvertent activation of the device by accidental depression of keys on the keypad 108 (see FIG. 2) as sometimes occurs in the conventional wireless communications device 10. In the Power Off position, no power is supplied to the wireless communications device. In the on-hook position, the optional keypad 108 may be at least partially disabled to prevent accidental activation of buttons on the keypad. In the off-hook position, the keypad may be fully activated thus allowing the user full operational capability of the wireless communications device.

In yet another embodiment, the antenna 120 and mechanical switch 204 may be a "permanent" switch or a "momentary" switch, or combination of the two. A permanent switch remains in the same physical position until it is manually rotated from that position. A momentary switch may be rotated to a position to accomplish some function, but then returns to a home position by means of a bias element, such as a spring.

In some versions of the wireless communication device 100, the antenna 120 does not extend from the housing 200 (see FIG. 3A). For example, antenna 120 may be a helical antenna that is rotatably coupled to housing 200. Although the antenna 120 may not extendible in this particular embodiment, the antenna 120 still may be configured to rotate about the axis of rotation 248.

Figure 7A:
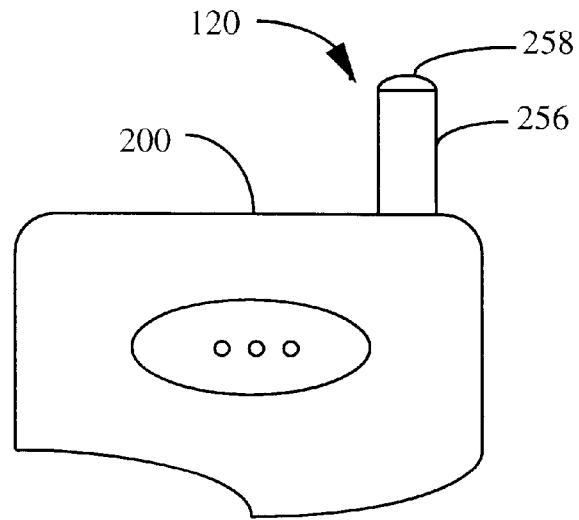
FIG. 7A is a partial front plan view illustrating the operation of another alternative embodiment of the antenna input device with a helical antenna and a whip antenna.
Figure 7B:
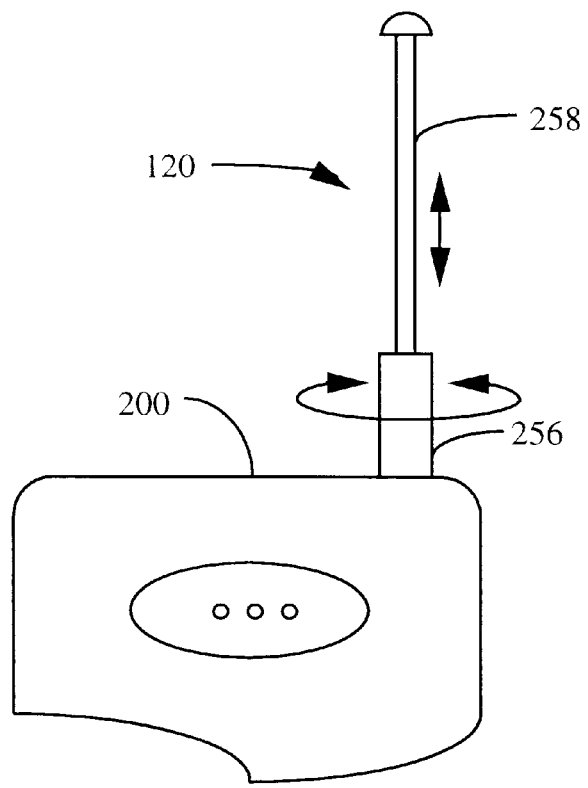
FIG. 7B is a partial front plan view illustrating the operation of the alternative embodiment of FIG. 7A with the whip antenna fully extended.

In other versions of the wireless communication device 100, the antenna 120 may actually comprise a helical antenna 256 and a whip antenna 258, as illustrated in FIGS. 7A and 7B. In FIG. 7A, the helical antenna 256 is located in proximity with the housing 200 and is not extendible. The whip antenna 258 is extendible and is illustrated in FIG. 7A in its retracted position.

In this embodiment, the antenna 120 can be used to turn power on and off to the wireless communication device 100. In this embodiment, the whip antenna 258 may be retracted within the housing 200. In the retracted position, illustrated in FIG. 7A, the switch 210 (see FIG. 3A) is activated and power is turned off to the wireless communications device 100. Even though the antenna 120 may be rotated while in the fully retracted position, the wireless communications device 100 will not respond. However, when the whip antenna 258 is extended, as illustrated in FIG. 7B, the switch 210 senses the extension of the antenna and supplies power to the wireless communications device 100.

With whip antenna 258 extended, the user may rotate the antenna to control operation of the wireless communications device in the manner described above. This can include continuous rotation to select displayed options, such as discussed above, or the limited rotation also discussed above to control the wireless communications device 100. This advantageously prevents the accidental activation of the wireless communications device 100 since no power is applied until the antenna 120 is extended. Other functionality may be provided as is described in copending U.S. patent application Ser. No. 08/723,662, entitled "METHOD AND APPARATUS FOR USING ANTENNA POSITION TO CONTROL A COMMUNICATION DEVICE", assigned to the assignee of the present invention and incorporated herein by reference. Although the teachings of the just mentioned patent application are specifically disclosed with respect to the extension and retraction of a wireless communication device antenna, they are equally applicable to the rotation of the antenna as disclosed herein.

It should also be noted that either the helical antenna 256 or the whip antenna 258 may be rotated to control operation of the wireless communication device 100. In the preferred embodiment, the helical antenna 256 is rotated to provide the user with greater tactile control of antenna rotation.

The antenna 120 and the position sensor 122 may also be used to provide other functionality for the wireless communications device 100. For example, the wireless communication device 100 can be internally programmed to recognize the activation of mechanical switch 210 only if the mechanical switch is activated two times within a predetermined period of time. This is similar to the conventional "double clicking" of a computer input device, such as a mouse. Only by double clicking the antenna 120 would a selected function be activated.

Although the antenna 120 is typically extended to its maximum length for normal operation of the wireless communications device, it is possible to extend the antenna 120 to different positions without serious adverse effect on the radio frequency (RF) performance. For example, one set of functions may be accessible when the antenna 120 is in the fully retracted position, as illustrated in FIG. 7A. A second set of functions may be accessible by rotation of the antenna 120 when it is partially extended. Finally, a third set of functions may be accessible only when the antenna 120 is fully extended to its maximum length, as illustrated in FIG. 7B.

Figure 8A:
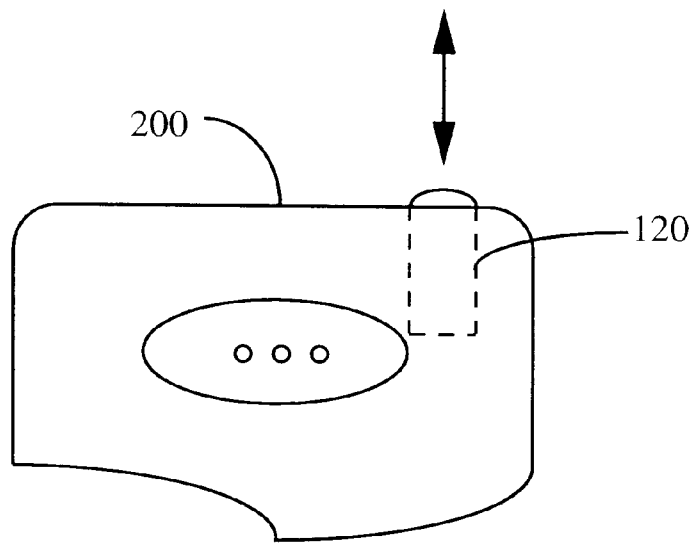
FIG. 8A is a partial front plan view of a push-button alternative embodiment of the antenna input device with the antenna fully retracted.
Figure 8B:
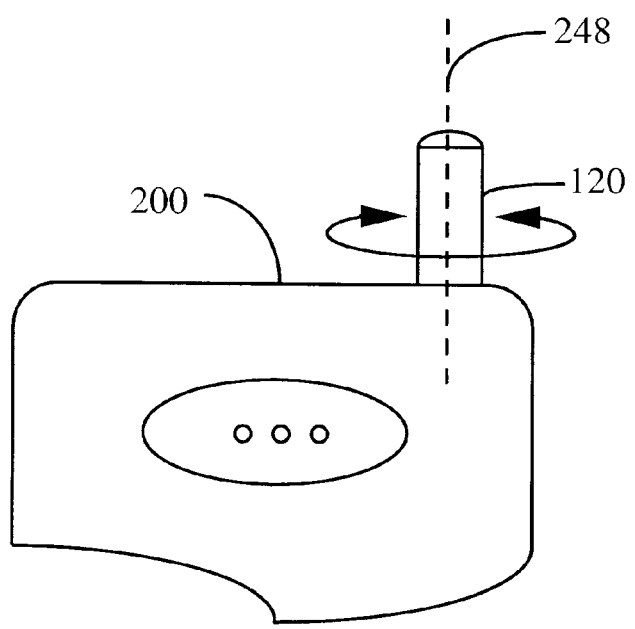
FIG. 8B is a partial front plan view illustrating the operation of the push-button embodiment of the antenna input device of FIG. 8A with the antenna extended.

In yet another embodiment, illustrated in FIGS. 8A and 8B, the antenna 120 is spring loaded and operates as a push-button. As shown in FIG. 8A, the antenna 120 is retracted within the housing 200 and can not be rotated by the user. To utilize the antenna 120 as an input device, the user depresses the antenna 120 in a longitudinal direction, causing the antenna 120 to extend as shown in FIG. 8B. In the extended position, the antenna 120 may be rotated to control operation of the wireless communication device 100 as discussed above with reference to the previous embodiments. The antenna 120 may have multiple positions such that a partial depression of the antenna may select a particular function, while a complete depression of the antenna 120 causes it to retract within the housing as shown in FIG. 8A. This embodiment may be used to control the power to the wireless communication device 100 in a manner similar to that described above. When the antenna 120 is fully retracted within the housing 200, no power is supplied to the wireless communication device 100. However, in an extended position, illustrated in FIG. 8B, power is supplied to the wireless communication device and the antenna 120 may be rotated in the manner described above to control operation of the wireless communication device 100.

Thus, the combination of antenna and input device provides the possibility of simplified user control of the wireless communications device. Proper operation of any wireless communications device requires an antenna and a user controlled input device. The wireless communications device 100 advantageously combines these two necessary functions such that the antenna 120 has dual functionality. In addition to its normal function as an RF antenna, the antenna 120 functions as a user input device. This reduces the number of keys required on the keypad 108, and may permit its elimination altogether.

It is to be understood that even though various embodiments and advantages of the present invention have been set forth in the foregoing description, the above disclosure is illustrative only, and changes may be made in detail, yet remain within the broad principles of the invention. For example, the operation of the antenna 120 and position sensor 122 have been described as controlling a number of different functions within the wireless communications device 100. However, the combination of antenna 120 and position sensor 122 may provide functional control of the wireless communications device 100 in a manner not described above. Therefore, the present invention is to be limited only by the appended claims.

We claim:

1. A system for controlling selection of functional parameters of a wireless communication device, the system comprising:

a housing;

a memory located within said housing for storing functional parameters of said communication device;

an antenna rotatably coupled to said housing, said antenna for transmitting and receiving radio frequency signals, said antenna having a longitudinal axis associated with its longest dimension, said antenna being displaceable along said longitudinal axis, and said antenna being rotatable about said longitudinal axis;

an antenna position sensor, within said housing and proximate said antenna, for sensing rotation of said antenna and for generating a position signal in response to said rotation; and a controller, within said housing and coupled to said antenna position sensor and said memory, for controlling selection of at least one functional parameter of said wireless communication device in response to said position signal.

2. The system of claim 1 wherein said antenna position sensor comprises at least one switch.

3. The system of claim 2 wherein said antenna has a first end rotatably retained within said housing and a cam fixedly attached to said antenna first end for activating said at least one switch upon rotation of said antenna.

4. The system of claim 1 further comprising a display attached to said housing, said display for displaying a plurality of selectable options, and wherein one of said plurality of selectable options is selected in response to said position signal.

5. The system of claim 4 wherein said antenna position sensor comprises at least one switch.

6. The system of claim 5 wherein said switch is activated by displacing said antenna in a direction along a longitudinal axis of said antenna.

7. The system of claim 6 wherein said displacement is a depression of said antenna.

8. The system of claim 1 wherein said position sensor comprises a rotary switch mechanically coupled to said antenna and having a predetermined number of switch positions, said switch positions being selected by said rotation of said antenna.

9. The system of claim 8 wherein said wireless communication device has a power-off mode and a power-on mode, and wherein one of said predetermined number of switch positions corresponds to said power-off mode.

10. The system of claim 8 wherein said rotary switch has a home switch position, the system further including bias means to urge said rotary switch to said home position when displaced from said home position.

11. The system of claim 1 wherein said position sensor comprises a rotary variable differential transformer (RVDT) for generating RVDT signals in response to said antenna rotation.

12. The system of claim 11 further comprising an RVDT to digital converter coupled to said RVDT for converting said RVDT signals into digital signals for use by said controller.

13. The method of claim 11 further comprising the steps of:

extending said antenna from said housing along a longitudinal axis; and generating said position signal in response to said extending step.

14. The method of claim 13 wherein said antenna has a retracted position and an extended position, said antenna being substantially disposed internally to said housing when in said retracted position, and being substantially disposed externally to said housing when in said extended position.

15. The method of claim 14 wherein said wireless communication device has a power-off mode and a power-on mode, and wherein said step of generating a position signal further comprises the steps of:

generating a first position signal corresponding to said power-off mode when said antenna is in said retracted position; and generating a second position signal corresponding to said power-on mode when said antenna is in said extended position.

16. The system of claim 1 wherein said position sensor comprises a an optical rotation sensor.

17. The system of claim 1 wherein said antenna is extendible from said housing along a longitudinal axis.

18. The system of claim 17 wherein said antenna comprises:

a helical antenna rotatably mounted to said housing; and a whip antenna, extending longitudinally through a center of said helical antenna, said whip antenna being extendible from said housing along a longitudinal axis.

19. The system of claim 17 wherein said antenna has a retracted position and an extended position, said antenna being substantially disposed internally to said housing when in said retracted position, and being substantially disposed externally to said housing when in said extended position.

20. The system of claim 19 wherein said wireless communication device has a power-off mode and a power-on mode, and wherein said antenna position sensor generates a first position signal corresponding to said power-off mode when said antenna is in said retracted position, and generates a second position signal corresponding to said power-on mode when said antenna is in said extended position.

21. The system of claim 20 wherein said wireless communication device further comprises bias means mechanically coupled to said antenna, for urging said antenna toward said extended position.

22. The system of claim 1 wherein said wireless communication device has a plurality of operating modes, and wherein said antenna has a plurality of antenna positions, each of said plurality of operating modes corresponding to at least one of said plurality of antenna positions.

23. The system of claim 22 wherein said plurality of operating modes includes a power-off mode, an on-hook mode, and an off-hook mode.

24. The system of claim 1 wherein said housing has a cutout portion for exposing a portion of the antenna for rotation by a user.

25. The system of claim 24 wherein said exposed portion of said antenna is textured to assist said user to rotate said antenna.

26. The system of claim 24 wherein said exposed portion of said antenna is covered with a material to assist the user to rotate the antenna.

27. A method for controlling a wireless communication device having an antenna rotatably connected about a longitudinal axis to a housing, the method comprising the steps of:

rotating said antenna about said longitudinal axis;

sensing said rotation of said antenna;

generating a position signal in response to said rotation; and controlling at least one functional parameter of said wireless communication device in response to said position signal.

28. The method of claim 27 further comprising the steps of:

displaying a plurality of selectable options; and selecting one of said plurality of selectable options in response to said position signal.

29. The method of claim 28 further comprising the steps of:

displacing said antenna in a direction along a longitudinal axis of said antenna; and generating said position signal in response to said displacement.

30. The method of claim 29 wherein said displacing step comprises depressing said antenna.

31. The method of claim 27 wherein said step of rotating said antenna comprises rotating said antenna among a plurality of predetermined antenna positions.

32. The method of claim 31 wherein said wireless communication device has a power-off mode and a power-on mode, and wherein one of said predetermined number of antenna positions corresponds to said power-off mode.

33. The method of claim 27 wherein said wireless communication device has a plurality of operating modes, and wherein said antenna has a plurality of antenna positions, each of said plurality of operating modes corresponding to at least one of said plurality of antenna positions.

34. The method of claim 33 wherein said plurality of operating modes includes a power-off mode, an on-hook mode, and an off-hook mode.

* * * * *